Aug. 3, 1965   R. M. DOLL   3,198,474
ADJUSTABLE SEAT
Filed Aug. 1, 1963   3 Sheets-Sheet 1

INVENTOR.
Robert M. Doll
BY
Barnard, McGlynn & Reising
ATTORNEYS

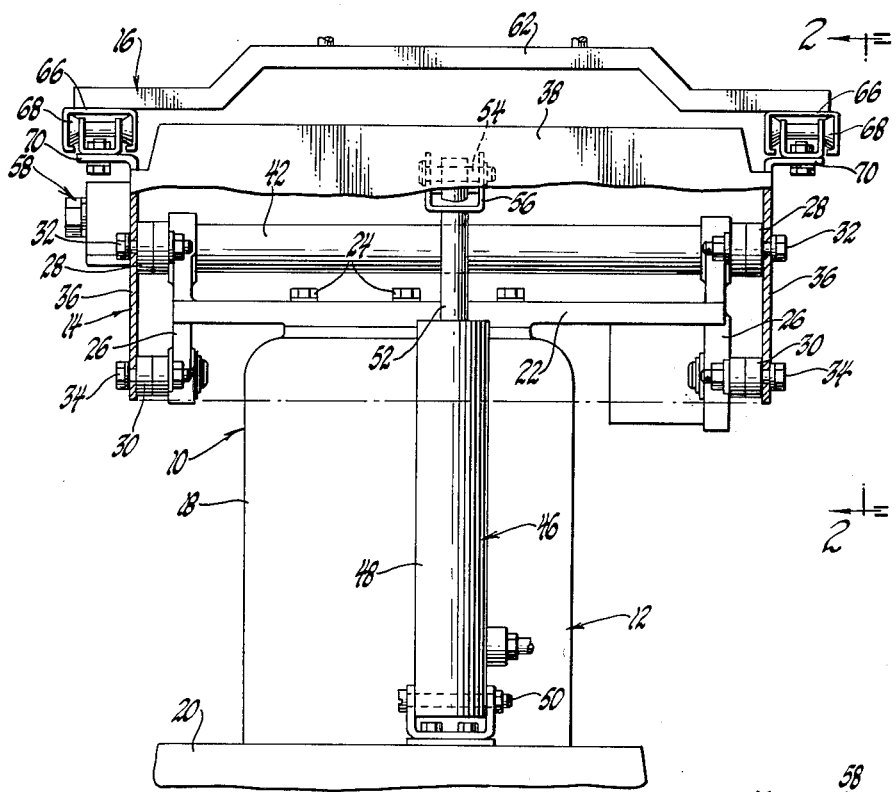
Fig. 4
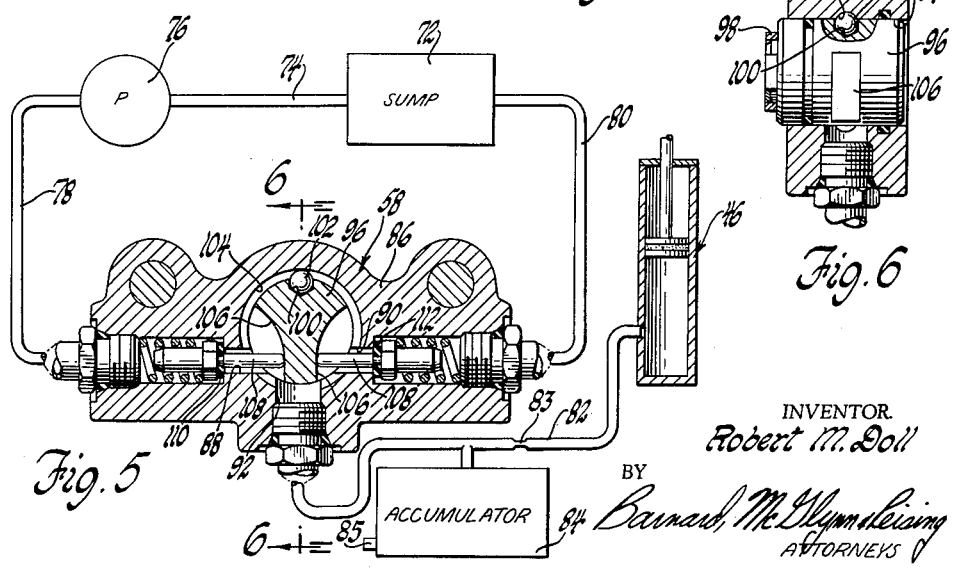
Fig. 5
Fig. 6
INVENTOR.
Robert M. Doll 3,198,474
ADJUSTABLE SEAT
Robert M. Doll, Inkster, Mich., assignor to Massey-Ferguson Incorporated, Detroit, Mich., a corporation of Maryland
Filed Aug. 1, 1963, Ser. No. 299,243
10 Claims. (Cl. 248—399)

This invention relates to seat assemblies and, in particular, to a vehicle seat assembly comprising seating means and adjustable suspension means therfor selectively operable to adjust the seating means vertically and horizontally to a particular height and horizontal position in accordance with the desires of a particular vehicle operator, the suspension means further including yieldable means functioning to support and suspend the seating means for rising and falling cushioned movement relative to the selected height thereof in response to loads imposed thereon.

Certain vehicles in use today, such as agricultural tractors and various types of earth-moving equipment such as self-propelled scrapers, are often operated at relatively great speeds over relatively rough terrain. As a consequence, considerable effort has been devoted to the design of seat assemblies including yieldable suspension means therefor to provide a cushioned body support and reasonably soft ride for the operators of such vehicles. Thus, vehicle seat assemblies have been devised comprising yieldable suspension means including spring members, such as axially wound mechanical torsion springs or torsionally resilient donuts of rubber or the like, operating through suitable linkage members to yieldably suspend a seating means for rising and falling cushioned movement in response to various dynamic or shock loadings imposed on the vehicle, the initial height of the seating means and the range of rising and falling movement thereof being initially determined by pre-selection of the loading of the spring member of the suspension in accordance with the static load or weight of the particular vehicle operator. In other words, a particular vehicle operator occupying such a seat of the type aforementioned has been required to initially operate some auxiliary gearing, mechanical linkage or the like connected to the spring member of the suspension mechanism to adjust and preload the spring member in accordance with his own static load or weight in order to initially dispose the seating means at a height suitable to such operator and, of course, preloading of the spring member in this manner has affected the "hardness" or "softness" of the cushioned ride and the range of cushioned movement of the seating means in response to dynamic or shock loads imposed thereon while occupied by such operator.

Therefore, and as will be apparent to those acquainted with such prior seat assemblies, initial adjustment of the seating means to a particular height and horizontal position by one vehicle operator in accordance with his weight does not dispose the seating means at the optimum height and position for another vehicle operator weighing considerably more or less than the operator making the initial adjustment. Thus, each subsequent operator must adjust the preload of the spring member of the suspension to dispose the seating means at the desired height and horizontal position in accordance with his weight. However, in making this adjustment, the cushioned ride itself is affected; that is, if the preload of the spring member of the suspension is increased, the "hardness" of the ride may increase and the range of cushioned rising and falling movement of the seating means may be decreased. Naturally, if the preload is decreased, the reverse situation occurs. In this regard, it is to be noted that the "hardness" or "softness" of the cushioned ride and the range of cushioned movement of the seating means play a very important part in contributing to or detracting from some of the more important purposes of such seat assemblies; that is, operator comfort and safety. Thus, preload of such a mechanical spring member of the suspension may be necessary to provide a particular seat height for one operator while automatically resulting in too soft or hard a ride for that operator, and too great a range of rising and falling movement of the seat assembly in response to dynamic loads imposed thereon. Furthermore, dangerous ride characteristics may result in the seat due to merely adjusting the latter to the desired height by variation of the preload of the spring member of the suspension; that is, it is not at all uncommon for seats of this type, particularly at relatively great preloads, to virtually become a catapult tending to throw the vehicle operator completely from the vehicle as the seating means rises and falls rhythmically under dynamic loads.

In view of the foregoing considerations, the present invention is directed to an improved seat assembly having the advantages of prior art seat assemblies in providing a cushioned ride, while avoiding adversely affecting the quality of the ride as to "softness" or "hardness" and the range of rising and falling movement of the seat assembly irrespective of variation in the initial height selected for the seat means of the assembly by vehicle operators of a different weights.

More particularly, the improved seat assembly of this invention comprises a base member mounted in a fixed position relative to the vehicle equipped with the seat, and a seat support means for the usual seat pan, and is particularly characterized by fluid pressure operated motor means operatively connected between the seat support means and the aforementioned base member, a source of substantially incompressible fluid under pressure, circuit means communicating the source to the motor means and including manually operatble selector valve means selectively controlling the supply and exhaust of fluid to and from the motor means to selectively adjust the position of the seat support means relative to the base member, and yieldable means responsive to variations in the pressure of the fluid in the motor means in response to variations in the load imposed on the seat support means to cushion movement of the latter relative to the base member.

Thus, and more specifically in this regard, the nature of the improved seat assembly of this invention is such that the aforementioned selector valve means may be manipulated by a given vehicle operator to initially supply or exhaust the incompressible operating fluid, such as oil, under pressure to the aforementioned motor means to initially adjust the height of the seat in accordance with his particular weight, the yieldable means aforementioned thereafter acting to cushion rising and falling movement of the seat support means and, since such yieldable means is independent of the height-adjusting mechanism for the seat, the "hardness" or "softness" of the ride and the range of rising and falling movement of the seat support means is unaffected by adjusting the height of the seat support means to different positions in accordance with the desires of different vehicle operators.

The present invention is further particularly characterized by the fact that the aforementioned yieldable means preferably takes the form of an accumulator connected in the aforementioned circuit means between the manually operable selector valve and motor means for adjusting the height of the seat assembly, the accumulator being of the type including a movable element such as a piston exposed on one side to the pressure of the fluid in the circuit means and on the other side to a suitable compressible fluid charged therein at a suitable variable pressure, whereby the accumulator will yieldably respond to changes in the pressure of the fluid in the circuit means in response to variations in loads imposed on the seat support means to cushion movement of the latter relative to the base member.

Referring to some of its more specific aspects, the invention is further particularly characterized by a parallelogram-type guide linkage operatively connected between the base member and the seat support means and being operable to maintain the latter substantially horizontal during cushioned movement thereof relative to the base member.

For a further description of the invention in conjunction with a preferred embodiment thereof, reference will now be made to the drawings in which:

FIGURE 4 is a view, partly broken away and in section to illustrate certain details, taken on line 4—4 of FIGURE 1;

FIGURE 5 is a sectional view of a selector valve and further schematically illustrates the connection of the latter in the fluid system for the seat suspension mechanism; and FIGURE 6 is a sectional view taken on line 6—6 of FIGURE 5.

Figure 1:
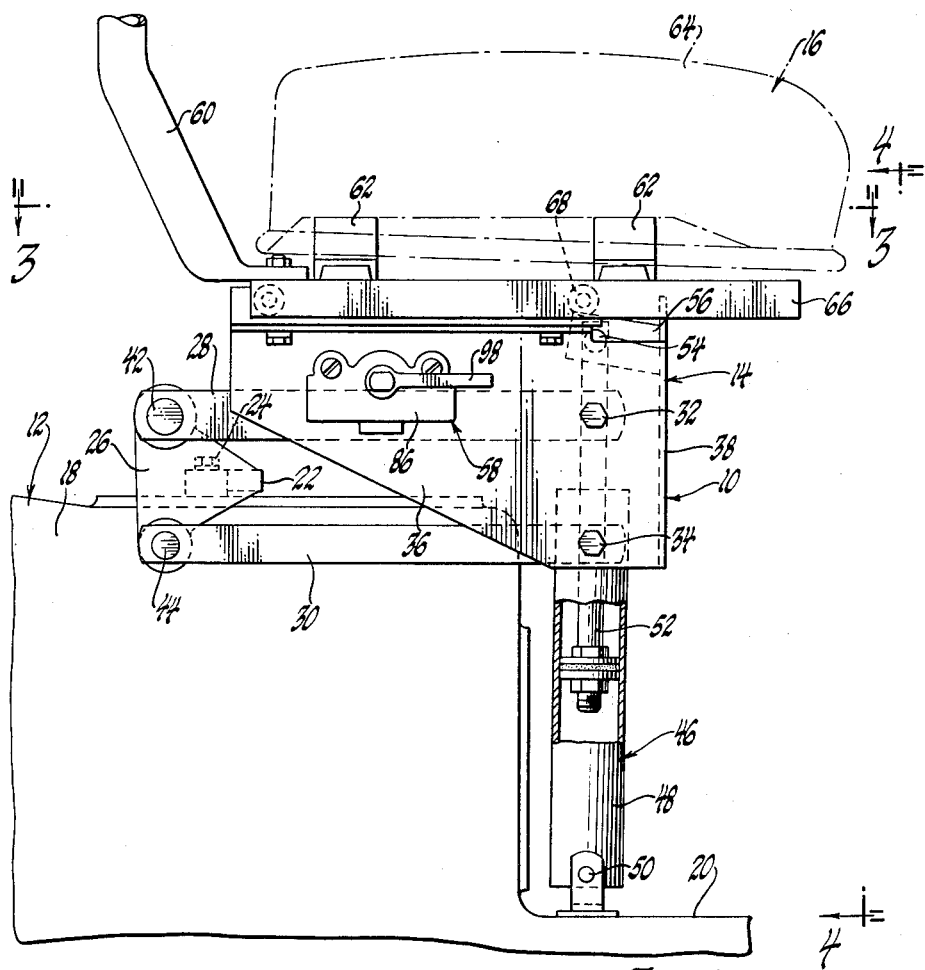
FIGURE 1 is a side elevational view of a seat assembly, partly broken away and in section to show certain details thereof, illustrating a preferred embodiment of the invention.
Figure 2:
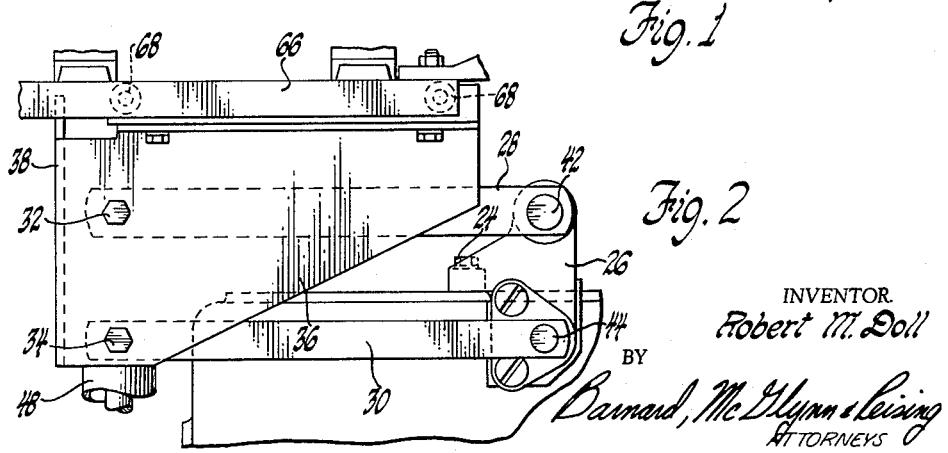
FIGURE 2 is a side elevational view of the seat assembly, partly broken away and in section to show certain details thereof, illustrating a preferred embodiment of the invention.

Referring now to the drawings, and particularly to FIGURES 1 and 4 thereof, the numeral 10 generally indicates a seat assembly comprising essentially a lower or base frame member 12, an upper or seat supporting frame member 14 yieldably suspended in a matter to be hereinafter described on the lower or base frame member aforementioned, and the seat means 16 horizontally adjustably mounted likewise in a manner to be hereinafter described on the upper or seat supporting frame member 14.

More specifically, the lower or base frame member 12 is shown as comprising an upstanding portion 18 of the vehicle 20 on which the seat assembly is mounted, although other means may be utilized to mount the seat assembly as long as such means is fixed relative to the vehicle as the portion 18 is. The lower or base frame member further comprises a laterally elongated mounting bracket 22 suitably rigidly secured intermediate its ends, as by the fasteners 24, to an upper wall of the portion 18 of the vehicle, and terminates in the laterally spaced mounting flanges 26.

Figure 3:
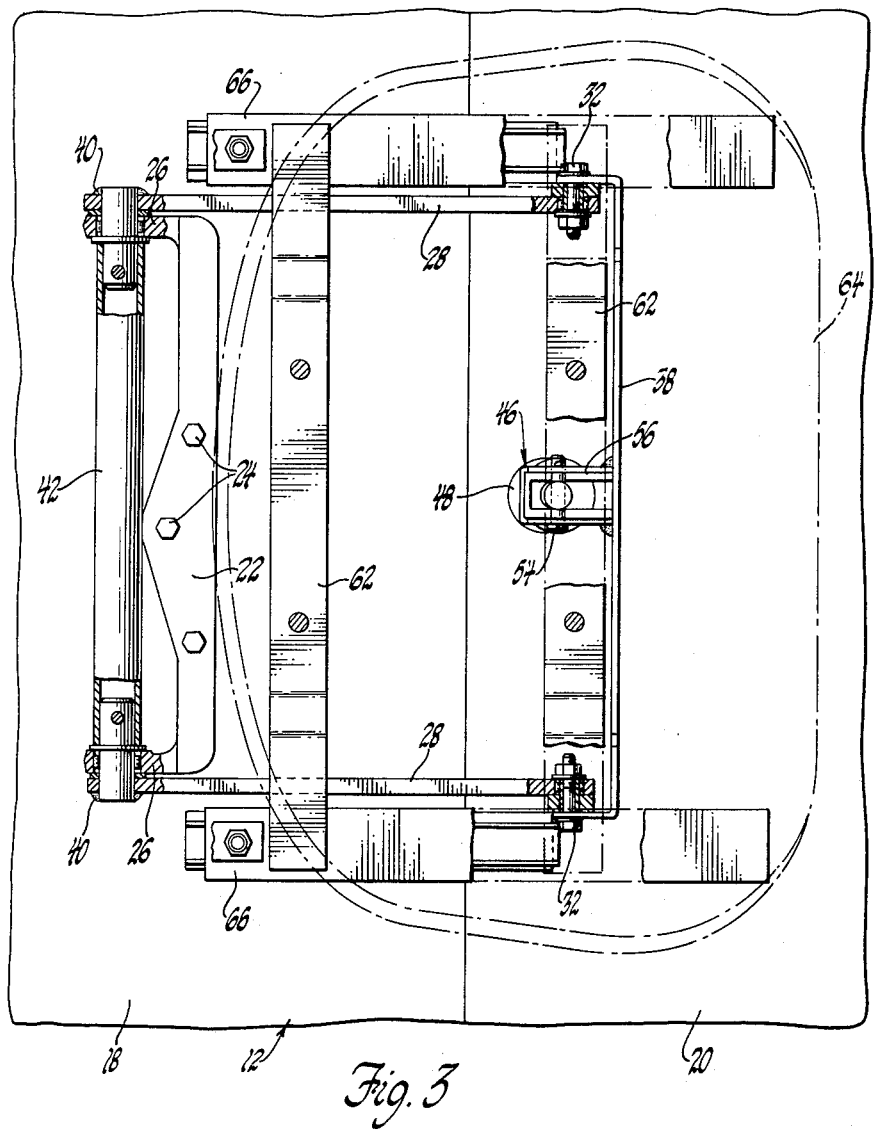
FIGURE 3 is a view, partly broken away and in section to illustrate certain details, taken along line 3—3 of FIGURE 1.

A pair of upper and lower parallelogram-type guide links 28 and 30, respectively each have a forward end thereof suitably pivotally connected at vertically spaced points indicated at 32 and 34 to each of the laterally spaced depending side walls 36 of the upper or seat supporting frame member 14 and which project rearwardly from the laterally extending front wall 38 thereof, while the other ends of the respective upper guide links 28 are suitably rigidly secured as indicated at 40 in FIGURE 3 to the opposite ends of a hollow tubular torsion bar 42 extending transversely of and suitably rotatably supported within and between the flanges 26 of the mounting bracket 22. The other ends of the lower guide links 30 are also suitably pivotally connected as indicated at 44 to the respective flanges of the mounting bracket 22 in a manner so that the respective pairs of guide links form a parallelogram-type linkage to substantially maintain the seat supporting frame member 14 in a horizontal attitude as it rises and falls within a range of cushioned movement thereof as will appear hereinafter. Furthermore, the torsion bar 42 resists any tendency of the upper guide links 28 moving vertically out of phase with respect to each other to substantially prevent oscillation or cocking of the seat supporting frame member 14 about a horizontal longitudinally extending axis as it rises and falls relative to the base member 12.

A fluid pressure operated jack 46 comprises a cylinder 48 suitably pivotally connected as indicated at 50 in a fixed position on the base member 12, and a piston 52 reciprocably disposed within the cylinder and pivotally connected as indicated at 54 to a bracket 56 fixed to and extending a slight distance rearwardly from the laterally extending front wall 38 aforementioned of the upper or seat supporting frame member 14 substantially midway between the depending side walls 36 thereof. A fluid system is provided, as will be described more specifically hereinafter, for controlling extension and retraction of the jack 46 to adjust the height of the upper or seat supporting frame member 14 relative to the lower or base frame member 12, such system including a manually operable selector valve indicated generally at 58 as being suitably mounted on one of the depending side walls 36 of the seat supporting frame 14. However, it may be observed that selector valve may be mounted in other positions such as, for example, on the control console of the vehicle forwardly of the vehicle seat.

The seat means 16 comprises the usual back rest member, not shown, suitably connected as by one or more of the frame members 60 to a seat frame, including frame members 62, on which the usual seat pan and cushion 64 rest, the seat frame being provided with laterally spaced downwardly opening tracks 66 mounted on roller means 68 suitably mounted on laterally outwardly projecting flanges 70 at the upper ends of the side walls 36 of the upper or seat supporting frame member 14, whereby the seat means 16 may be adjusted horizontally relative to and along the seat supporting frame member 14. Although not shown, there will naturally be provided a conventional manually operable latch mechanism operable to lock the seat base 16 at any desired horizontal position of adjustment along the seat supporting frame member 14.

Referring now particularly to FIGURES 5 and 6 and the fluid system associated with the seat assembly 10, such system may be seen to comprise a sump 72 for oil or other substantially incompressible fluid for supply through a conduit 74 to the inlet of a suitable pump 76 preferably driven through a suitable accessory drive from the vehicle engine. Fluid so supplied is delivered under pressure through a conduit 78 to an inlet port of the selector valve 58 aforementioned, the valve further including an exhaust port communicating through the conduit 80 to the sump. A third port is provided in the valve and communicates through the conduit 82 including restriction 83 therein to the piston head side of the jack 46. A suitable accumulator 84 is connected to the conduit 82 between the restriction 83 therein and the selector valve 58 for response to changes in the pressure of the fluid in the jack 46, it being understood that the accumulator may be of any conventional type characterized, for example, by a movable rigid piston or flexible diaphragm member cooperating with a housing to form a chamber to receive fluid under pressure from conduit 82 through restriction 83 in opposition to a force imposed in a chamber on the other side of the piston or diaphragm preferably filled through charging port 85 with a suitable compressible fluid medium, such as air, at the desired pressure, or even a resilient mechanical spring element.

Referring now to the details of the selector valve 58, it may be seen to comprise a valve body 86 including an inlet port 88 connected to the conduit 78, an exhaust port 90 connected to the conduit 80, and a third port 92 connected to the conduit 82 and the jack 46. Each of the aforementioned ports communicates with a bore 94 in the valve body in which the valve operator 96 is suitably mounted for rotation and manual manipulation through a lever 98, as illustrated in FIGURE 1, suitably secured to one end of the valve operator externally of the valve body. The valve operator is generally of cylindrical configuration and includes a radially inwardly directed opening or seat 100 for a locating ball 102 or the like confined within an annular groove 104 communicating with the bore of the valve body. In addition, the side wall of the valve operator 96 is slotted intermediate its ends to provide opposed, identical, flat, curved surfaces 106 engaging at all times respectively with the end of pins 108 connected to one-way spring loaded check valves 110 and 112 associated with the respective inlet and exhaust ports 88 and 90 to prevent any operating flow of fluid through the valve body with the check valves seated and the valve operator 96 in a neutral position as shown in FIGURES 5 and 6. With the valve operator in its neutral poistion as aforementioned, operating fluid is locked in conduit 82 between the port 92 and the jack 46 to maintain the upper or seat supporting member 14 and the seat means 16 at a preselected height relative to the base member 12. The handle 98 may be manipulated to rotate the valve operator from its neutral position to first and second operating positions, respectively, wherein it depresses or opens the inlet and exhaust valves to admit fluid under pressure to or exhaust fluid pressure from the port 92 to extend or retract the jack 46 as desired to adjust the height of the seat supporting frame 14 and the seat means 16.

In operation, it may be assumed that the seat assembly 10 has just been installed on a vehicle and the entire assembly is collapsed; that is, the seat supporting frame member 14 and the seat means 16 are in the lowermost position they are capable of assuming relative to the base member 12. At this time, and with the pump 76 operating, the selector valve 58 may be manipulated to open the inlet port 88 to supply fluid under pressure to the port 92 and, through conduit 82, to the jack 46 to elevate the seat supporting frame member 14 and seat means 16 to an initial poistion. Thereafter, it may now be assumed that a vehicle operator of some particular weight occupies the seat means 16 and finds the height thereof relative to the base member to be too great or too small in accordance with his desires. Under such circumstances, he will accordingly rotate the valve operator 96 to its first or second operating position aforementioned to open either the inlet port 88 or exhaust port 90 to supply fluid to or exhaust fluid from the port 92 and the jack 46 to position the height of the seat to his requirements. At the same time, naturally, he will correspondingly adjust the horizontal position of the seat means 16 on the seat supporting frame member 14. In addition, he may charge or bleed, as the situation warrants, the compressible spring fluid to or from the accumulator using port 85 thereof in a conventional manner to provide an optimum spring rate for his weight and existing operating conditions.

With the seat so occupied and adjusted under static conditions, the vehicle may be driven across rough and regular terrains resulting in dynamic loadings on the seat support frame 14. Thus, for example, when a vehicle wheel drops into a hole or the like resulting in seat support frame member 14 falling toward the base frame member 12, the accumulator 84 acts in opposition to the increase in pressure in the conduit 82 due to downward movement of the piston of jack 46 to cushion such falling movement, followed by recovery of the accumulator and return thereof to thrust the seat support frame member 14 upwardly. Such rising and falling movement of frame member 14 is dampened due to the fact that the fluid in conduit 82 must pass through restriction 83 between the jack 46 and the accumulator.

If a subsequent occupant of the seat finds the height of the latter not to his liking, he may, of course, manipulate the selector valve 58 as previously described to obtain the height he desires. In this regard, it should be noted that the operation of the accumulator 84 is in no way affected by adjustment of the height of the seat support frame member 14. In other words, irrespective of the height to which the seat support frame member 14 may be adjusted, a substantially solid link of incompressible fluid exists in the conduit 82 between the jack 46 and the selector valve 58 with the latter in its neutral position as aforedescribed, and the accumulator responds solely to changes of pressure in such conduit and, hence, in the jack 46. Furthermore, if desired or required, such a subsequent operator may charge or bleed the compressible spring fluid from the accumulator to provide the desired spring rate and ride characteristics.

It may be noted further that the jack 46 has its center of thrust located in a vertical plane substantially midway between the pairs of guide links 28 and 30 whereby thrusts imposed on the seat support frame member 14 are generally equalized between such guide links. However, to the extent that extraneous forces may tend to tilt or twist the seat support frame member 14 about a longitudinally extending horizontal axis, as by a seat occupant sitting to one side thereof, the connection of the upper guide links 28 to the torsion bar 42 counteracts such tilting or twisting action as aforedescribed.

In addition, it may be noted that the opposing action of the spring biased check valves 110 and 112 on the valve operator 96 operates to automatically dispose the latter in its neutral position with both valves seated as illustrated in FIGURE 5. Thus, rotation of the valve operator to either its first or second operating position as aforedescribed depresses the spring associated with the valve being operated resulting in such spring returning the valve operator automatically to its neutral position upon release of the operating handle 98.

While the restriction 83 for dampening purposes as aforementioned is shown as being located in conduit 82, it will be apparent that such restriction may be incorporated in a conventional manner within the jack 46. Also, rather than manually shifting the seat means 16 horizontally upon the seat supporting frame member 14 and relying on a conventional latch as aforedescribed to hold the seat means in an adjusted position, such a latch may be eliminated and replaced by a suitable fluid pressure operated jack similar to jack 46 but of the double acting variety suitably connected between the frame member 14 and seat means 16. In this event, such a jack would be connected through a suitable control valve in the system aforedescribed, whereby the seat means may be power adjusted horizontally and retained in an adjusted position on frame member 14.

The embodiments of the invention in which an exclusive property or privilege is claimed are defined as follows:

1. A seat assembly comprising a base member mounted in a fixed position relative to a seat support means, seat support means, fluid pressure operated motor means operatively connected between said base member and said seat support means, a source of substantially incompressible fluid under pressure, circuit means communicating said source to said motor means and including selector valve means selectively controlling the supply and exhaust of fluid to and from said motor means to selectively adjust the position of said seat support means relative to said base member, yieldable means responsive to variations in the pressure of the fluid in said motor means in response to variations in the load imposed on said seat support means to cushion movement of the latter relative to said base member, and means for varying the static pressure exerted by said yieldable means without affecting the static unloaded height of said seat support means.

2. A seat assembly comprising a base member mounted in a fixed position relative to a seat support means, seat support means, fluid pressure operated motor means operatively connected between said seat support means and said base member, a source of substantially incompressible fluid under pressure, circuit means communicating said source to said motor means and including selector valve means selectively controlling the supply and exhaust of fluid to and from said motor means to selectively adjust the position of said seat support means relative to said base member, yieldable accumulator means including compressible fluid means communicating with said circuit means and being responsive to changes in the pressure of the fluid in the latter in response to variations in the load imposed on said seat support means to cushion movement of the latter relative to said base member, and means for varying the static pressure exerted by said accumulator means without affecting the static unloaded height of said seat support means.

3. A seat assembly comprising a base member mounted in a fixed position relative to a seat support means, seat support means, fluid pressure operated motor means operatively connected between said base member and said seat support means, a source of substantially incompressible fluid under pressure, circuit means communicating said source to said motor means and including manually operable selector valve means having a neutral position holding fluid in said circuit means between said valve means and said motor means, said valve means having first and second operating positions respectively controlling supply and exhaust of fluid to and from said motor means to selectively adjust the position of said seat support means relative to said base member, yieldable accumulator means including a compressible fluid communicating with said circuit means, said accumulator means with said valve means in said neutral position thereof being responsive to changes in the pressure of the fluid in said circuit means in response to variations in the load imposed on said seat support means to yieldably cushion movement of the latter relative to said base member, and means for varying the static pressure exerted by said accumulator means without affecting the static unloaded height of said seat support means.

4. A seat assembly comprising a base member mounted in a fixed position relative to a seat support means, seat support means, fluid pressure operated motor means operatively pivotally connected between said base member and said seat support means and including relatively reciprocable piston and cylinder members, a source of substantially incompressible fluid under pressure, circuit means communicating said source to said motor means and including manually operable selector valve means having a neutral position holding fluid in said circuit means between said valve means and said motor means, said valve means having first and second operating positions respectively controlling supply and exhaust of fluid to and from said motor means to selectively adjust the position of said seat support means relative to said base member, yieldable accumulator means including a compressible fluid communicating with said circuit means, said accumulator means with said valve means in said neutral position thereof being responsive to changes in the pressure of the fluid in said circuit means as said members of said motor means reciprocate relative to each other in response to variations in the load imposed on said seat support means to yieldably cushion movement of the latter relative to said base member, and means for varying the static pressure exerted by said accumulator means without affecting the static unloaded height of said seat support means.

5. The seat assembly according to claim 4 further comprising parallelogram-type guide linkage means operatively pivotally connected between said base member and said seat support means and being operable to maintain the latter substantially horizontal during cushioned movement thereof relative to said base member.

6. A seat assembly comprising a base member mounted in a fixed position, seat support means, fluid pressure operated motor means operatively pivotally connected between said base member and said seat support means and including relatively reciprocable piston and cylinder members, a source of substantially incompressible fluid under pressure, circuit means communicating said source to said motor means and including manually operable selector valve means having a neutral position holding fluid in said circuit means between said valve means and said motor means, said valve means having first and second operating positions respectively controlling supply and exhaust of fluid to and from said motor means to selectively adjust the position of said seat support means relative to said base member, yieldable accumulator means including a compressible fluid communicating with said circuit means, said accumulator means with said valve means in said neutral position thereof being responsive to changes in the pressure of the fluid in said circuit means as said members of said motor means reciprocate relative to each other in response to variations in the load imposed on said seat support means to yieldably cushion movement of the latter relative to said base member, a pair of laterally spaced guide link means each having one end therof respectively pivotally connected to said seat support means, and torsion bar means rotatably supported on said base member, the other ends of said guide link means being respectively rigidly secured to said torsion bar means.

7. A seat assembly comprising a base member mounted in a fixed position, seat support means, fluid pressure operated motor means operatively pivotally connected between said base member and said seat support means and including relatively reciprocable piston and cylinder members, a source of substantially incompressible fluid under pressure, circuit means communicating said source to said motor means and including manually operable selector valve means having a neutral position holding fluid in said circuit means between said valve means and said motor means, said valve means having first and second operating positions respectively controlling supply and exhaust of fluid to and from said motor means to selectively adjust the position of said seat support means relative to said base member, yieldable accumulator means including a compressible fluid communicating with said circuit means, said accumulator means with said valve means in said neutral position thereof being responsive to changes in the pressure of the fluid in said circuit means as said members of said motor means reciprocate relative to each other in response to variations in the load imposed on said seat support means to yieldably cushion movement of the latter relative to said base member, a first pair of laterally spaced guide link means each having one end thereof respectively pivotally connected to said seat support means, torsion bar means rotatably supported on said base member, the other ends of said guide link means being respectively rigidly secured to said torsion bar means, and a second pair of laterally spaced guide link means each having the opposite ends thereof respectively pivotally connected to said seat support means and said base member in spaced relation to the respective connections of the ends of said first pair of guide link means thereto to form a parallelogram-type linkage to maintain said seat support means substantially horizontal during cushioned movement thereof relative to said base member.

8. The seat assembly according to claim 7 wherein said seat support means includes laterally spaced depending wall members, the respective pivotal connections of said first and second pairs of guide link means to said seat support means being to said respective wall members and between the latter.

9. The seat assembly according to claim 7 wherein said seat support means includes laterally spaced depending wall members enclosing a portion of the lengths of said first and second pairs of said guide link means, the respective pivotal connections of said first and second pairs of guide link means to said seat support means being to said respective wall members.

10. A seat assembly comprising a base member mounted in a fixed position, seat support means, fluid pressure operated motor means operatively connected between said base member and said seat support means, a source of substantially incompressible fluid under pressure, circuit means communicating said source to said motor means and including selector valve means selectively controlling the supply and exhaust of fluid to and from said motor means to selectively adjust the position of said seat support means relative to said base member, yieldable means responsive to variations in the pressure of the fluid in said motor means in response to variations in the load imposed on said seat support means to cushion movement of the latter relative to said base member, a pair of laterally spaced guide link means each having one end thereof respectively pivotally connected to said seat support means, and torsion bar means rotatably supported on said base member, the other ends of said guide link means being respectively rigidly secured to said torsion bar means.

References Cited by the Examiner

UNITED STATES PATENTS 3,045,703 7/62 Alfieri _____ 267—65 X
3,100,101 8/63 Trevaskis _____ 248—400

FOREIGN PATENTS 873,986 8/61 Great Britain.

CLAUDE A. LE ROY, *Primary Examiner.*

UNITED STATES PATENT OFFICE
CERTIFICATE OF CORRECTION

Patent No. 3,198,474

August 3, 1965

Robert M. Doll

It is hereby certified that error appears in the above numbered patent requiring correction and that the said Letters Patent should read as corrected below.

Column 2, line 28, strike out "a"; line 38, for "operatble" read -- operable --; column 3, lines 23 and 24, strike out "latter in the fluid system for the seat suspension mecha- of;" and insert instead -- sembly of FIGURE 1 taken from the other side thereof; --; column 4, line 26, after "that" insert -- the --; column 5, line 41, for "poistion" read -- position --.

Signed and sealed this 31st day of May 1966.

(SEAL)
Attest:

ERNEST W. SWIDER
Attesting Officer

EDWARD J. BRENNER
Commissioner of Patents